(12) United States Patent
Bloesch et al.

(10) Patent No.: US 8,095,571 B2
(45) Date of Patent: Jan. 10, 2012

(54) PARTITIONING MODELING PLATFORM DATA

(75) Inventors: Anthony C. Bloesch, Vashon, WA (US); Ozben Evren, Redmond, WA (US); Noaa Avital, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 394 days.

(21) Appl. No.: 12/489,245

(22) Filed: Jun. 22, 2009

(65) Prior Publication Data

US 2010/0325170 A1    Dec. 23, 2010

(51) Int. Cl.
G06F 7/00 (2006.01)
G06F 9/44 (2006.01)

(52) U.S. Cl. .................... 707/803; 717/106

(58) Field of Classification Search ............... 707/999.1, 707/999.102, 802, 803; 717/106, 100; 709/228
See application file for complete search history.

(56) References Cited

U.S. PATENT DOCUMENTS

| | | |
|---|---|---|
| 5,581,755 A | 12/1996 | Koerber |
| 5,737,591 A | 4/1998 | Kaplan |
| 5,878,432 A | 3/1999 | Misheski |
| 5,950,209 A | 9/1999 | Carrier |
| 5,978,811 A | 11/1999 | Smiley |
| 6,038,393 A | 3/2000 | Lyengar |
| 6,167,405 A | 12/2000 | Rosensteel |
| 6,173,439 B1 | 1/2001 | Carlson |
| 6,240,416 B1 | 5/2001 | Immon |
| 6,381,743 B1 | 4/2002 | Mitschler |
| 6,460,052 B1 | 10/2002 | Thomas |
| 6,532,588 B1 | 3/2003 | Porter |
| 6,578,037 B1 | 6/2003 | Wong |
| 6,598,219 B1 | 7/2003 | Lau |
| 6,662,188 B1 | 12/2003 | Rasmussen |
| 6,681,382 B1 | 1/2004 | Kakumani |
| 6,745,332 B1 | 6/2004 | Wong |
| 6,874,146 B1 | 3/2005 | Iyengar |
| 6,920,458 B1 | 7/2005 | Chu et al. |
| 6,959,326 B1 | 10/2005 | Day |
| 6,978,281 B1 | 12/2005 | Kruy |
| 6,996,558 B2 | 2/2006 | Dettinger |
| 7,028,057 B1 | 4/2006 | Vasudevan |
| 7,076,496 B1 | 7/2006 | Ruizandrade |
| 7,120,898 B2 | 10/2006 | Grover et al. |
| 7,133,871 B2 | 11/2006 | Sluiman |
| 7,143,091 B2 | 11/2006 | Charnock |
| 7,146,355 B2 | 12/2006 | Chu-Carroll |
| 7,146,606 B2 | 12/2006 | Mitchell |
| 7,155,703 B2 | 12/2006 | Meijer et al. |
| 7,168,063 B2 | 1/2007 | Meijer |

(Continued)

OTHER PUBLICATIONS

U.S. Appl. No. 11/749,616, filed Feb. 4, 2001, Office Action.

(Continued)

Primary Examiner — Hung T Vy
(74) Attorney, Agent, or Firm — Workman Nydegger

(57) ABSTRACT

The present invention extends to methods, systems, and computer program products for partitioning modeling platform data. Embodiments of the invention facilitate partitioning modeling platform data into nested horizontal slices. Using nested horizontal slices makes the modeling platform data more manageable and permits modeling platform data to align with existing tools and processes. Schemas and tables can be used to partition modeling platform data vertically and folders can be used to partition modeling platform data horizontally. Thus, a user-interface can preset the intersection of folders and schemas/tables as navigable chunks of data compatible with existing tools and processes, such as, for example, software development tools.

20 Claims, 5 Drawing Sheets

U.S. PATENT DOCUMENTS

| | | | |
|---|---|---|---|
| 7,213,037 | B2 | 5/2007 | Rangadass |
| 7,349,913 | B2 | 3/2008 | Clark |
| 7,350,172 | B1* | 3/2008 | Koh et al. ............... 716/136 |
| 7,383,255 | B2 | 6/2008 | Desai |
| 7,558,781 | B2 | 7/2009 | Probst |
| 7,783,763 | B2* | 8/2010 | Tuel ............... 709/228 |
| 2002/0087665 | A1 | 7/2002 | Marshall |
| 2002/0184194 | A1 | 12/2002 | Yoon |
| 2003/0079107 | A1 | 4/2003 | Booth |
| 2003/0225768 | A1 | 12/2003 | Chaudhuri |
| 2004/0010776 | A1 | 1/2004 | Shah |
| 2004/0088578 | A1 | 5/2004 | Chao et al. |
| 2004/0167899 | A1 | 8/2004 | Patadia |
| 2004/0167920 | A1 | 8/2004 | Owen |
| 2004/0186836 | A1 | 9/2004 | Schlesinger |
| 2004/0193594 | A1 | 9/2004 | Moore |
| 2004/0193912 | A1 | 9/2004 | Li |
| 2004/0199867 | A1 | 10/2004 | Brandenborg |
| 2005/0044089 | A1 | 2/2005 | Wu |
| 2005/0050053 | A1 | 3/2005 | Thompson |
| 2005/0050084 | A1* | 3/2005 | Atm ............... 707/102 |
| 2006/0026168 | A1 | 2/2006 | Bosworth |
| 2006/0041661 | A1 | 2/2006 | Erikson |
| 2006/0112129 | A1 | 5/2006 | Kostojohn |
| 2007/0055680 | A1 | 3/2007 | Statchuk |
| 2007/0073673 | A1 | 3/2007 | McVeigh |
| 2007/0073776 | A1 | 3/2007 | Kalalian et al. |
| 2007/0156687 | A1 | 7/2007 | Idicula et al. |
| 2007/0192374 | A1 | 8/2007 | Abnous |
| 2007/0203925 | A1* | 8/2007 | Sandler et al. ............... 707/100 |
| 2007/0208744 | A1 | 9/2007 | Krishnaprasad |
| 2007/0255677 | A1 | 11/2007 | Alexander |
| 2007/0276851 | A1 | 11/2007 | Friedlander |
| 2008/0098349 | A1* | 4/2008 | Lin et al. ............... 717/106 |
| 2008/0163332 | A1 | 7/2008 | Hanson |
| 2008/0177692 | A1 | 7/2008 | Bloesch |
| 2008/0201330 | A1 | 8/2008 | Bloesch |
| 2008/0201355 | A1 | 8/2008 | Bloesch |
| 2008/0288510 | A1 | 11/2008 | Bloesch |
| 2008/0320377 | A1 | 12/2008 | Seetharamakrishnan et al. |

OTHER PUBLICATIONS

Office Action dated Nov. 16, 2009 cited in U.S. Appl. No. 11/749,616.
Office Action dated Jan. 19, 2010 cited in U.S. Appl. No. 11/626,815.
Ort and Bhakti, Java Architecture for XML Binding, Mar. 2003, pp. 1-12.
McCluskey, Using Java Reflection, Jan. 1998, 99. 1-8.
Haggar, Java Bytecode: Understanding bytecode makes you a better programmer, Jul. 1, 2001, pp. 1-9.
U.S. Appl. No. 11/749,607, filed Mar. 9, 2010, Office Action.
U.S. Appl. No. 11/749,616, filed May 6, 2010, Office Action.
U.S. Appl. No. 12/112,773, filed May 10, 2011, Office Action.
Microsoft SOA & Business Process, "Oslo", 2007, 1 page.
MSDN, "Oslo" Repository Architecture, 2009, 23 pages.
Tangsripairoj, Songsri, et al., "Organizing and Visualizing Software Repositories Using the Growing Hierarchical Self-Organizing Map", Journal of Information Science and Engineering 22, 283-295 (2006), Nov. 2005, pp. 283-295.
Rose, Thomas, et al., "Organizing Software Repositories Modeling Requirements and Implementation Experiences", 1992 IEEE, pp. 31-38.
Macchini, Bruno, Reusing Software with ESTRO (Evolving Software Repository), 1992 IEEE, pp. 150-157.
Petro, James, et al., "Model-Based Reuse Repositories—Concepts and Experience", 1995 IEEE, pp. 60-69.
Neil et al., "A Study of Usability of Web-Based Software Repositories" in: IEEE Software Methods and Tools 2000, Nov. 2000, pp. 51-58.
Viewpoints: A Framework for Integrating Multiple Perspectives in System Development, A. Finkelsetin, J. Kramer, B. Nuseibeh, L. Finkelstein, M. Goedicke, http://www.cs.ucl.ac.uk/staff/A.Finkelstein/papers/ijseke92.pdf (27 pages).

A Framework for Expressing the Relationship Between Multiple Views in Requirements Specification, Bashar Nuseibeh, Jeff Kramer, Anthony Finkelstein, Oct. 1994, http://www.cs.ucl.ac.uk/staff/A.Finkelstein/papers/tse94.icse.pdf (20 pages).
Using Multiple Representations Within a Viewpoint, Nigel James Stranger, Nov. 30, 1999, http://eprints.otago.ac.nz/26/01/Thesis.pdf (496 pages).
Andre Van Der Hoek et al., "A Generic, Peer-toPeer Repository for Distributed Configuration Management," Software Engineering Research Laboratory, Department of Computer Science, University of Colorado, Boulder, Colorado. 1999 IEEE Proceedings of ICSE-18, available at http://delivery.acm.org/10.1145/230000/227786/p308-van_der_hoek.pdf?key1=227786&key2=1334925611&coll=GUIDE&dll=GUIDE&CFID-8075646&CFTOKEN=65412344.
Philip A. Bernstein, et al., "Microsoft Repository Version 2 and the Open Information Model," Microsoft Corporation, One Microsoft Way, Redmond, Washington, available at https://research.microsoft.com/~philbe/Info%20Sys%20on%20MS%20Repository%20for%20Web.pdf.
Edward Sciore, "Versioning and Configuration Management in an Object-Oriented Data Model," VLDB Journal, 3, 77-106, 1994, available at http://www.vldb.org/journal/VLDBJ3/P077.pdf.
Pierre-Alain Muller, Franck Fleurey, Didier Vojtisek, Zoe Drey, Damien Pollet, Frederic Fondement, Philippe Studer and Jean-Marc Jezequel, "On Executable Meta-Languages applied to Model Transformations," [online] Date Unknown, [retrieved on Dec. 4, 2006], pp. 1-48. Retrieved from the Internet: http://www.irisa.fr/triskell/publis/2005/Muller05c.pdf.
Branko Milosavljevic, Milan Vidakovic, Srdjan Komazec and Gordana Milosavljevic, Faculty of Engineering, University of Novi Sad, Yugoslavia "User Interface Code Generation for EJB-Based Data Models Using Intermediate Form Representations," [online] Copyright 2003, PPPJ Jun. 16-18, 2003, Kilkenny City, Ireland, [retrieved on Dec. 4, 2006], pp. 125-128. Retrieved from the Internet: http://delivery.acm.org/10.1145/960000/957327/p125-milosavljevic.pdf?key1=957327&key2=4411925611&coll=GUIDE&dl=GUIDE&CFID=75919783&CFTOKEN=9279190.
Neel Sundaresan and Reshad Moussa, NehaNet Corp., San Jose, California, "Algorithms and Programming Models for Efficient Representation of XML for Internet Applications," [online] WWW10, May 1-5, 2001, [retrieved on Dec. 4, 2006], pp. 366-375. Retrieved from the Internet: http://delivery.acm.org/10.1145/380000/372090/p366-sundaresan.pdf?key1=372090&key2=4204925611&coll=ACM&dl=ACM&CFID=75919783&CFTOKEN=92791909.
Aske Simon Christensen, Anders Moller and Michael I. Schwartzbach, University of Aarhus, Denmark, "Extending Java for High-Level Web Service Construction," [online] ACM Transactions on Programming Languages and Systems, vol. 25, No. 6, Nov. 2003, [retrieved on Dec. 4, 2006], pp. 814-875. Retrieved from the Internet: http://delivery.acm.org/10.1145/950000/945890/p814-s_christensen.pdf?key1=945890&key2=3681925611&coll=ACM&dl=ACM&CFID=75919783&CFTOKEN=92791909.
Weinberger, Ellis, et al., "A security policy for a digital repository", Oct. 2002, 5 pages.
Bustamente, Michele Leroux, "Building a Claims-Based Security Model in WCF", The ServerSide .NET Your Enterprise .NET Community, Mar. 28, 2007, 10 pages.
Worboys, Geoff, et al., "Firebird File and Metadata Security", Dec. 7, 2005, Document version 0.5, 12 pages.
Office Action dated Dec. 17, 2008 cited in U.S. Appl. No. 11/676,170 (Copy Attached).
U.S. Appl. No. 11/626,815, filed Jul. 23, 2010, Office Action.
"What's on the CD?", O'Reilly VB .NET Core Classes in a Nutshell for Visual Studio .NET version 1.0, 2002, pp. 1-6.
U.S. Appl. No. 11/749,607, filed Aug. 30, 2010, Notice of Allowance.
Venkatrao, SQL/CLI A New Binding Style for SQL, SIGMOD Record, vol. 24, No. 4, Dec. 1995, pp. 72-77.
Office Action dated Jul. 21, 2009 cited in U.S. Appl. No. 11/676,170.
Office Action dated Aug. 19, 2009 cited in U.S. Appl. No. 11/749,607.

* cited by examiner

PARTITIONING MODELING PLATFORM DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many computing environments, databases are used to store large quantities of data. For example, some modeling platforms are configured to store data for modeling a large number of applications. It is not uncommon in these, and other types of computing environments, for millions or even tens of millions of rows of data to be present. Due at least in part to the volume of data, it can be difficult to efficiently manage and discover data in these computing environments.

Accordingly, various different partitioning strategies have been used to attempt to promote more efficient data management and discoverability. For example, some strategies partition data using different types of hierarchies based on such things as directories, distinguished names (DN), metadata registries and repositories, nested records, object dictionaries, etc. Unfortunately, most, if not all, of these strategies limit the ability to create partitions that align with existing tools and processes used to interact with data in the systems where they are used.

BRIEF SUMMARY

The present invention extends to methods, systems, and computer program products for partitioning modeling platform data. In some embodiments, modeling data from a repository is partitioned for more efficient use in modeling applications. Modeling data is partitioned as an intersection of folders and schemas. Accordingly, the modeling data is represented as portions of data having a specified granularity, which application modeling tools can efficiently process.

The modeling data is vertically partitioned into a plurality of vertical partitions based on a plurality of corresponding schemas. For each schema in the plurality of corresponding schemas, a vertical partition is created. Repository modeling data that is formatted in accordance with the schema is grouped together in the vertical partition.

The vertically partitioned modeling data is horizontally partitioned into a folder hierarchy. The folder hierarchy includes a plurality of folders based on a user-defined folder structure. For each folder in the folder hierarchy, modeling data from any of the different vertical partitions corresponding to the folder is grouped into the folder based on the user-defined folder structure. Accordingly, the folder hierarchy groups related modeling data together as portions of data having the specified granularity.

In other embodiments, folders facilitate managing the lifecycle of modeling data. A folder manager accesses modeling data from a production repository. The modeling data is presented in hierarchically in hierarchically arranged folders in the user-interface. Modeling data included in leaf folders is partitioned vertically based on a plurality of different schemas and partitioned horizontally based on corresponding application.

A request to access modeling data for an application is received through the user-interface. The modeling data is copied from the production repository to a local store. Input for generating code for the application is received at an integrated development environment. The integrated development environment outputs code for the application. The code is synchronized with the model data for the application in the local repository. The code is submitted to a source code control system to facilitate updating the model data in the production repository subsequent to synchronizing the code with the model data for the application in the local store.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth at hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
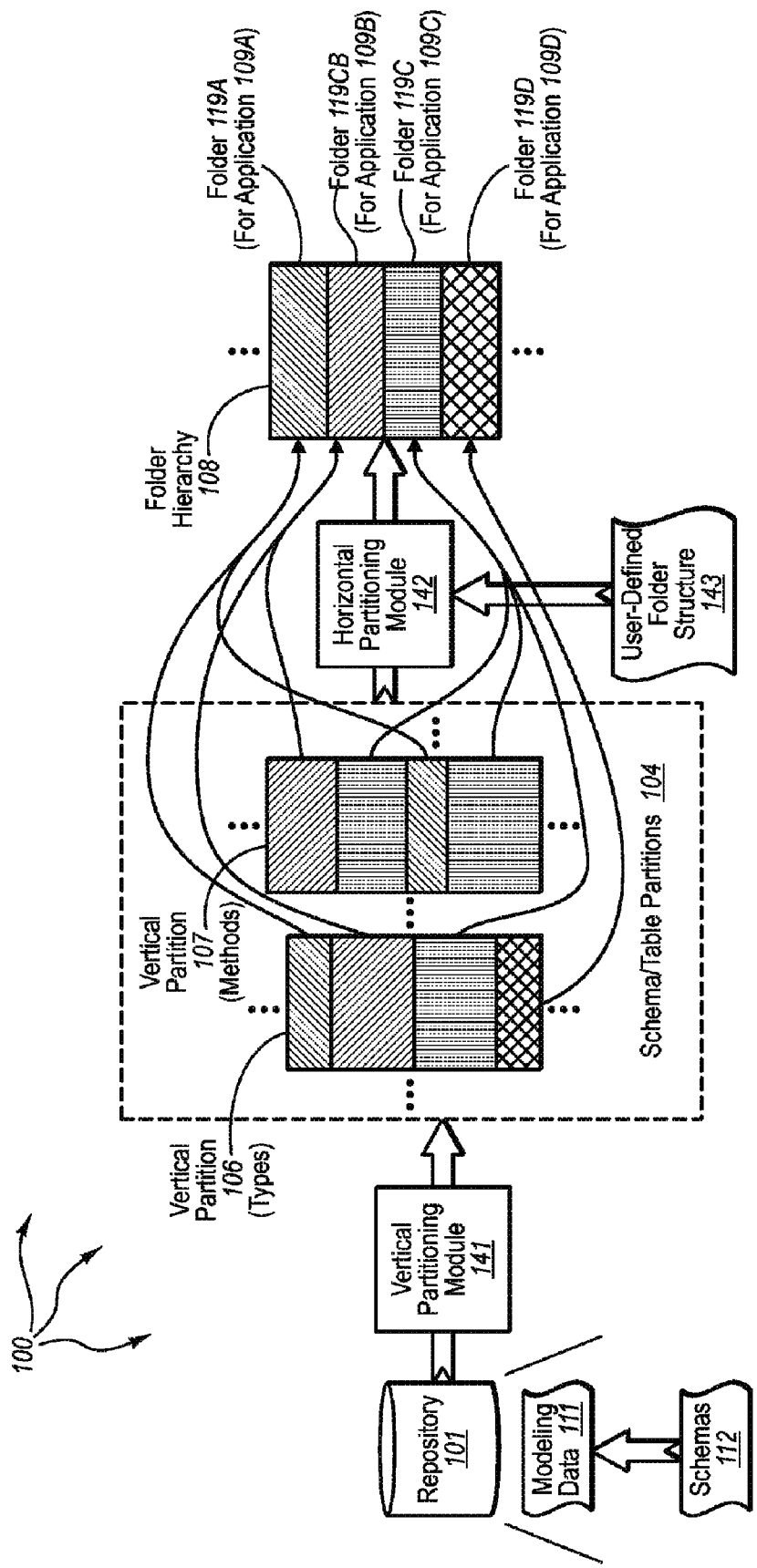
FIG. 1 illustrates an example computer architecture that facilitates partitioning modeling platform data.

The present invention extends to methods, systems, and computer program products for partitioning modeling platform data. In some embodiments, modeling data from a repository is partitioned for more efficient use in modeling applications. Modeling data is partitioned as an intersection of folders and schemas. Accordingly, the modeling data is represented as portions of data having a specified granularity, which application modeling tools can efficiently process.

The modeling data is vertically partitioned into a plurality of vertical partitions based on a plurality of corresponding schemas. For each schema in the plurality of corresponding schemas, a vertical partition is created. Repository modeling data that is formatted in accordance with the schema is grouped together in the vertical partition.

The vertically partitioned modeling data is horizontally partitioned into a folder hierarchy. The folder hierarchy includes a plurality of folders based on a user-defined folder structure. For each folder in the folder hierarchy, modeling data from any of the different vertical partitions corresponding to the folder is grouped into the folder based on the user-defined folder structure. Accordingly, the folder hierarchy groups related modeling data together as portions of data having the specified granularity.

In other embodiments, folders facilitate managing the lifecycle of modeling data. A folder manager accesses modeling data from a production repository. The modeling data is presented in hierarchically in hierarchically arranged folders in the user-interface. Modeling data included in leaf folders is partitioned vertically based on a plurality of different schemas and partitioned horizontally based on corresponding application.

A request to access modeling data for an application is received through the user-interface. The modeling data is copied from the production repository to a local repository. Input for generating code for the application is received at an integrated development environment. The integrated development environment outputs code for the application. The code is synchronized with the model data for the application in the local repository. The code is submitted to a source code control system to facilitate updating the model data in production repository subsequent to synchronizing the code with the model data for the application in the local repository.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates partitioning modeling platform data. As depicted, computer architecture includes repository 101, vertical partitioning module 141, and horizontal partitioning module 142. Modeling data 111 (e.g., application platform modeling data) is stored in repository 101. Modeling data 111 can be stored in variety of different formats according to schemas 112. Schemas 112 can include different schemas for different programming elements, such as, for example, types, methods, attributes, objects, etc. Modeling data 111 can also be spread out across a plurality of different tables in repository 101.

Generally, vertical partitioning module 141 is configured to (e.g., vertically) group modeling data into partitions based on schemas and possible also tables. For example, portions of modeling data defined in accordance with the same schema can be grouped together in the same vertical partition. Generally, horizontal partitioning module 142 is configured to (e.g., horizontally) partition other (e.g., vertical) partitions that group data based on schemas and possibly also tables. For example, horizontal partitioning module 142 can group together different portions of modeling data in different vertical partitions into the same folder based on user-defined folder structure 143. In some embodiments, user-defined folder structure 143 defines a folder hierarchy (e.g., a tree structure) for partitioning modeling data into folders by corresponding application. User-defined folder structure 143 can be configured to following the classification taxonomy of the organization that is partitioning the data.

Figure 3:
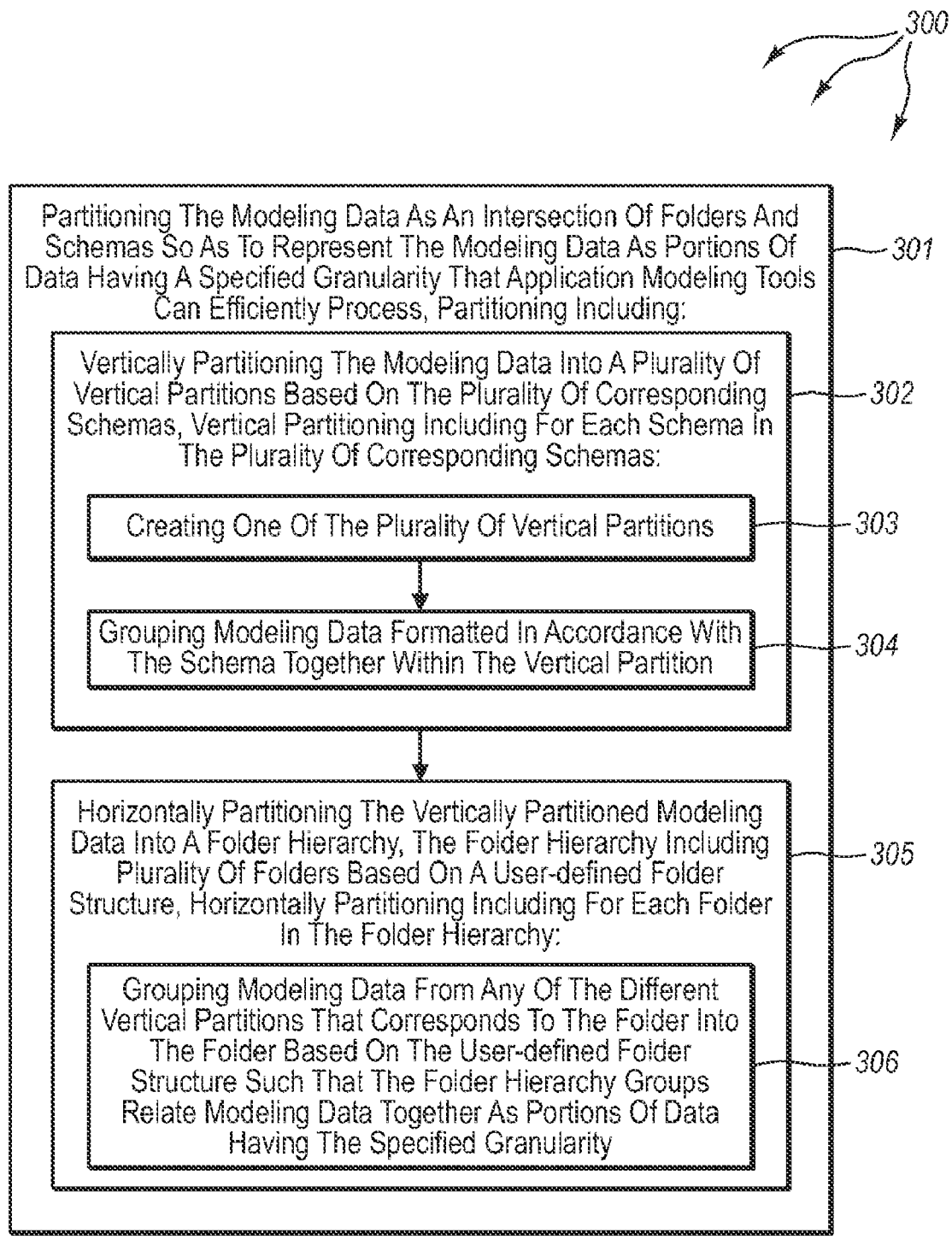
FIG. 3 illustrates a flow chart of an example method for partitioning modeling platform data.

FIG. 3 illustrates a flow chart of an example method 300 for partitioning modeling platform data. Method 300 will be described with respect to the components and data in computer architecture 100.

Method 300 includes an act of partitioning the modeling data as an intersection of folders and schemas so as to represent the modeling data as portions of data having a specified granularity that application modeling tools can efficiently process (act 301). For example, the modules of computer architecture 100 can interoperate to partition model data 111 as an intersection of schemas 112 and folders 108. Accordingly, modeling data 111 can be represented at a specified granularity (e.g., folders 108) compatible with software development tools.

Partitioning the modeling data includes an act of vertically partitioning the modeling data into a plurality of vertical partitions based on the plurality of corresponding schemas (act 302). For example, vertical partitioning module 141 can vertically partition modeling data 111 into schema/table partitions 104 based on schemas 112. For each schema, vertical partitioning includes an act of creating one of the plurality of vertical partitions (act 303). Vertical partitioning module 141 can create a vertical partition of modeling data (from modeling data 111) for each schema in schemas 112. For example, vertical partitioning module 141 can create vertical partition 106 for modeling data defined in accordance with a "type" schema. Similarly, vertical partitioning module 141 can create vertical partition 107 for modeling data defined in accordance with a "method" schema. Vertical partitioning module 141 can create additional vertical partitions for other modeling data defined in accordance with other schemas.

For each schema, vertical partitioning includes grouping modeling data formatted in accordance with the schema together in the vertical partition (act 304). For example, vertical partitioning module 141 can group together data formatted in accordance with the "type" schema in vertical partition 106. Thus, "type" programming elements for a variety of different applications can be spread throughout vertical partition 106. Similarly, vertical partitioning module 141 can group together data formatted in accordance with the "method" schema in vertical partition 107. Thus, "method" programming elements for a variety of different applications can be spread throughout vertical partition 107. Vertical partitioning module 141 can group together data formatted in accordance to other schemas in schemas 112. Thus, these other programming elements can be spread throughout corresponding vertical partitions.

Partitioning the modeling data includes an act of horizontally partitioning the vertically partitioned modeling data into a folder hierarchy, the folder hierarchy including a plurality of folders based on a user-defined folder structure (act 305). For example, horizontal partitioning module 142 can horizontally partition schema/table partitions 104 into folder hierarchy 108 (e.g., a tree structure). Folder hierarchy 108 can include a plurality of folders based on user-defined folder structure 143.

For each folder, horizontally partitioning includes an act of grouping modeling data from any of the different vertical partitions that corresponds to the folder into the folder based on the user-defined folder structure such that the folder hierarchy groups relate modeling data together as portions of data having the specified granularity (act 306). For example, horizontal partitioning module 142 can group modeling data from any of the vertical partitions in schema/table partitions 104 in a corresponding folder based on user-defined folder structure 143. Accordingly, folder hierarchy 108 can group modeling data 111 in folders that relate portions of modeling data 111 together at a specified granularity. For example, horizontal partitioning module 142 can group modeling data from vertical partitions in schema/table partitions 104 together into folders 119A, 119B, 119C, and 119D. Each folder can correspond to an application. For example, folders 119A, 119B, 119C, and 119D can correspond to applications 109A, 109B, 109C, 109D respectively. Thus, each folder can group together programming elements for a specified application that is separate from programming elements for other applications.

Figure 2A:
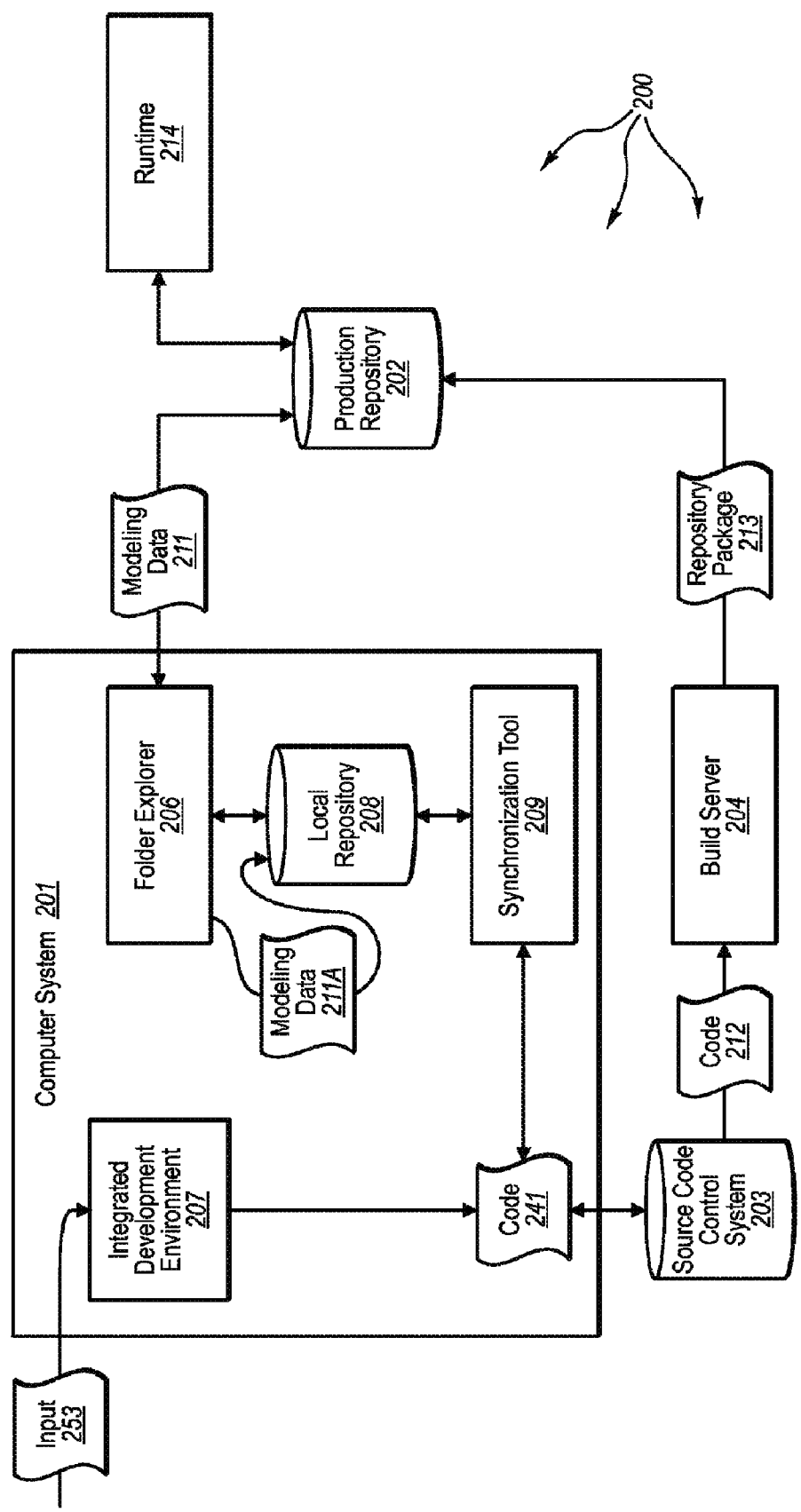
FIG. 2A illustrates an example computer architecture that facilitates managing the lifecycle of modeling platform data.

FIG. 2A illustrates an example computer architecture 200 that facilitates managing the lifecycle of modeling platform data. As depicted, computer architecture 200 includes computer system 201, production repository 202, runtime 214, source code control system 203, and build server 204. Each of the depicted computer systems and components can be connected to one another over (or be part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. Alternately, different subsets of components can be resident on the same computer system. For example, source code control system 203 and builder server 204 may be on the same machine.

As depicted, computer system 201 further includes folder explorer 206, local repository 208, synchronization tool 209, and integrated development environment 207. Generally, folder explorer 206 includes the functionality described with respect to computer architecture 100. That is, folder explorer 206 can partition modeling data as an intersection of folders and schemas to represent modeling data at a specified granularity (e.g., compatible with other modules at computer system 101). Folder explorer can access portions of modeling data from production repository 202 and store the accessed portions of modeling data in local repository 208.

Figure 2B:
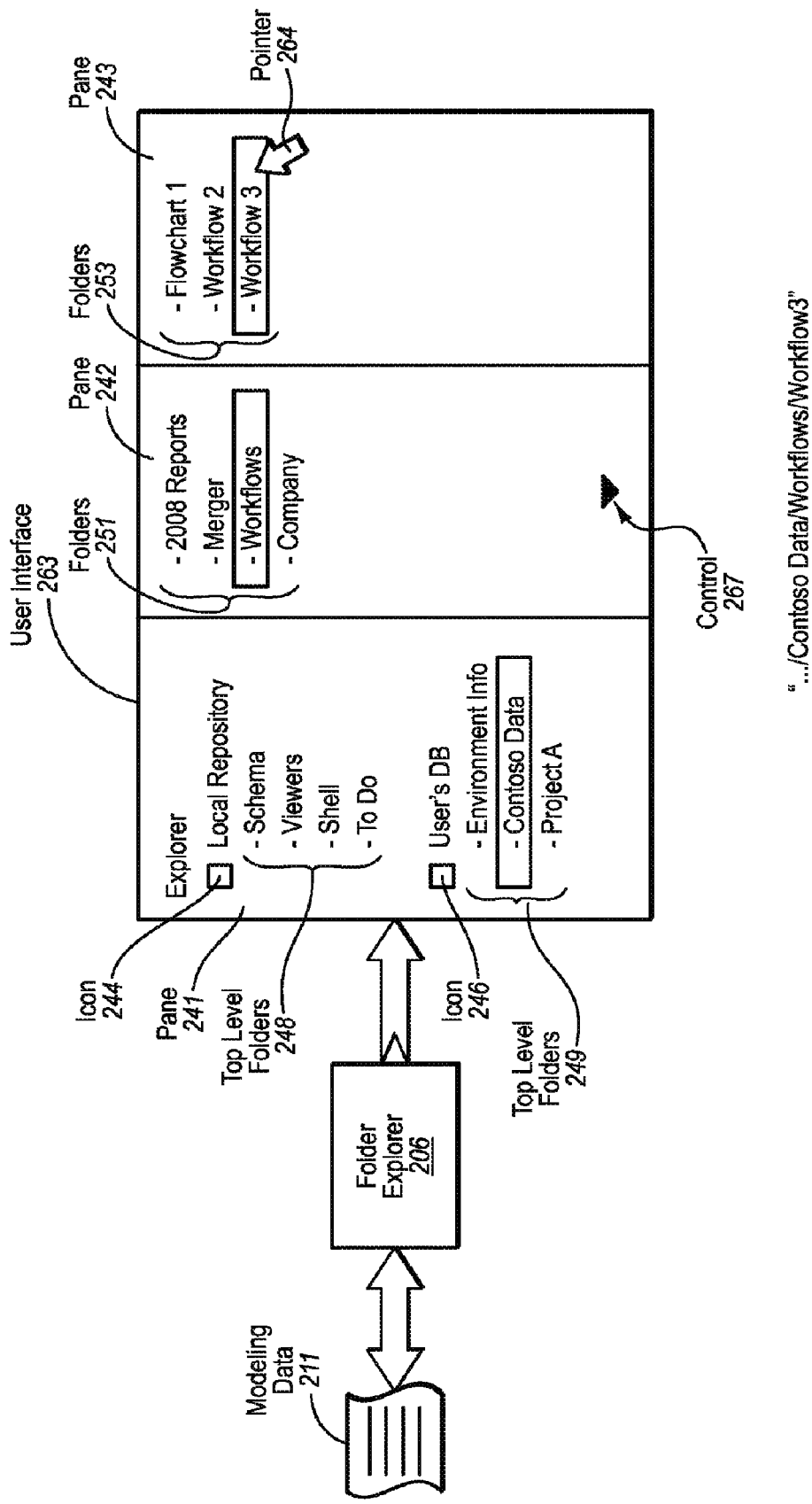
FIG. 2B illustrates an example of a user-interface screen generated by a folder explorer.

FIG. 2B illustrates an example of a user-interface screen 262 generated by folder explorer 206. As depicted, folder explorer 206 can receive modeling data 211 and generate user-interface 263. User-interface 263 represents a plurality of folders in accordance with a user-defined folder structure. As depicted, pointer 264 indicates that the current folder path " . . . /contoso data/workflows/workflow3" is selected. The path " . . . /contoso data/workflows" represents a folder path to the modeling data for "workflow3".

A user can interact with user-interface 263 using various user-interface controls to navigate between different folders. Pane 241 depicts different databases a user is connected to.

For example, icons 244 and 246 indicate that the user is connected to databases Local Repository" and "User's DB" respectively. Top level folders 248 and 249 indicates the top level folders in the respective databases "Local Repository" and "User's DB".

Pane 242 depicts children folders 251 of "Contoso Data", the selected folder in pane 241 (as indicated by the box). Control 267 is a scrolling control permitting a user to see more data if it exists). Pane 243 depicts children folders 253 of "Workflows", the selected folder in pane 242 (as indicated by the box). Subsequent panes to the right of pane 243 can be used to depict children of the pane to its immediate left. For example, a next pane to the right can depict children folders of "Workflow 3", the selected folder in pane 243 (as indicated by the box).

Integrated development environment 207 can present a single program providing comprehensive facilities for software development. Integrated development environment 207 can include one or more of a source code editor, a compiler, an interpreter, a debugger, and build automation tools. A single graphical user interface can provide access to any modules included in integrated development environment 207. The modules of integrated development environment 207 can operate together in a cohesive manner to increase code development efficiency. Developed code can be in any number different programming languages including visual basic, C#, etc.

Synchronization tool 209 is configured to synchronize local repository 208 with the file system of computer system 201 including code from integrated development environment 207. Synchronized code can then be delivered to source code control system 203. Generally, source code control system 203 provides versioning control to manage changes to programs.

Build server 204 is configured to build code (e.g., Visual Basic, C#, etc.) in to repository deployment package (e.g., a .rpk file conforming to Ecma 376 standard). Build server 204 can store repository deployment packages in production repository 202. Runtime 214 can execute repository packages to invoke application functionality.

Figure 4:
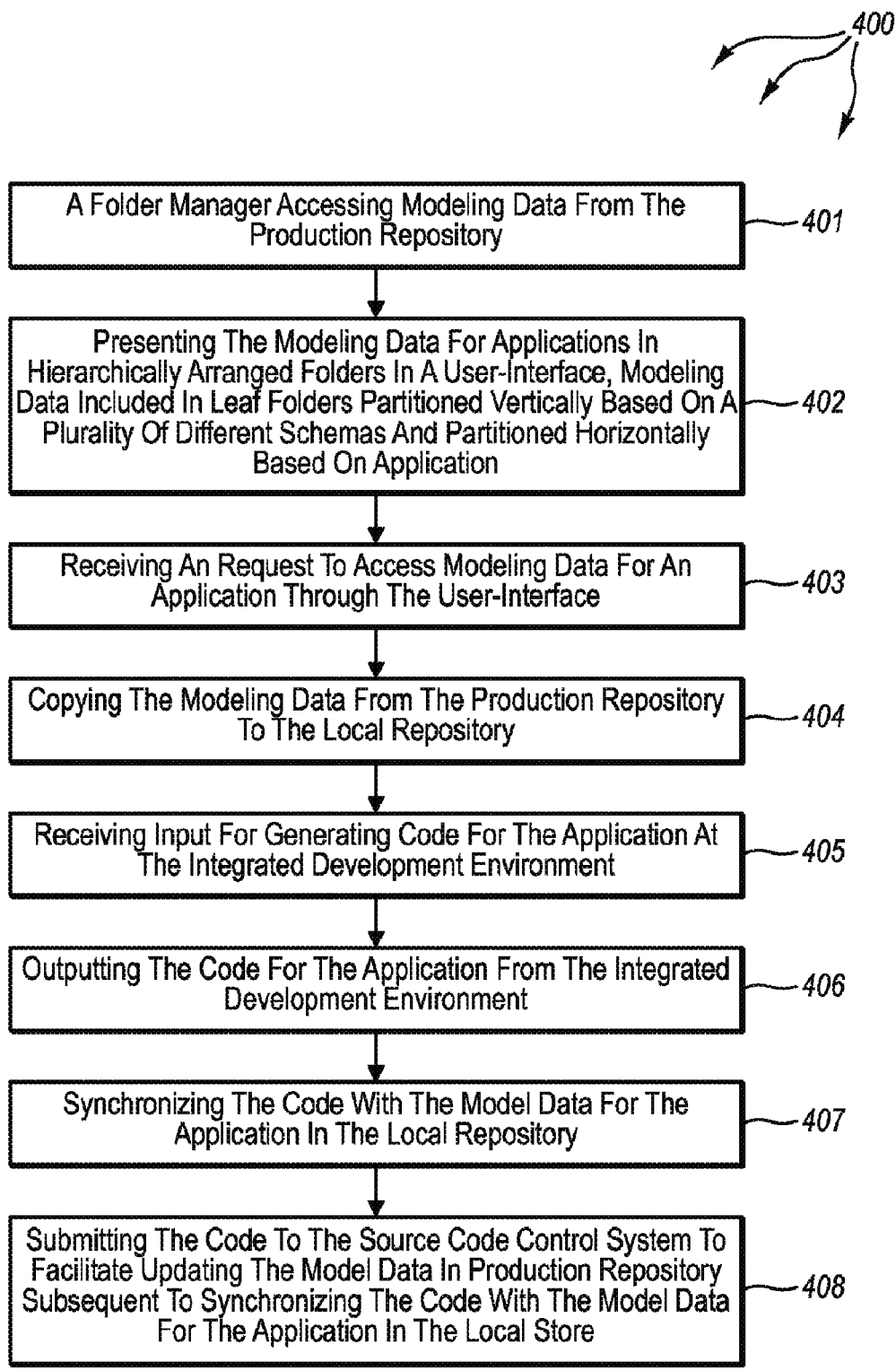
FIG. 4 illustrates a flow chart of an example method for managing the lifecycle of modeling platform data.

FIG. 4 illustrates a flow chart of an example method 400 for managing the lifecycle of modeling platform data. The method 400 will be described with respect to the components and data in computer architecture 200 and Method 400 includes an act of a folder manager accessing modeling data from the production repository (act 401). For example, folder explorer 206 can access modeling data 211 from production repository 202. Method 400 includes an act of presenting the modeling data for applications in hierarchically arranged folders in a user-interface, data included in leaf folders partitioned vertically based on a plurality of different schemas and partitioned horizontally based on application (act 402). For example, folder explorer 206 can present user-interface 263. User-interface 263 presents modeling data 211 in hierarchically arranged folders. Data in leaf folders, such as, for example, in " . . . /contoso data/workflows/workflow3", is partitions vertically based schemas used in production repository 202 and is partitioned horizontally by application (e.g., as indicated in a user-defined folder structure).

Method 400 includes an act of receiving a request to access modeling data for an application through the user-interface (act 403). For example, a user can used pointer 264 to select "workflow3" from user-interface 263. "workflow3" can represent modeling data 211A (a portion of modeling data 211).

Method 400 includes an act of copying the data from the production repository to the local repository (act 404). For example, in response to the selection with pointer 264, folder explorer 206 can copy modeling data 211A to local repository 208.

Method 400 includes an act of receiving input for generating code for the application at the integrated development environment (act 405). For example, integrated development environment 207 can receive input 253, for example, from an application developer. Based on input 253, integrated development environment 207 can generate code 241, such as, for example, a visual basic file or C# file. Method 400 includes an act of outputting the code from the integrated development environment (act 406). For example, integrated development environment 207 can output code 241.

Method 400 includes an act of synchronizing the code with the model data for the application in the local repository (act 407). For example, synchronization tool 209 can synchronize code 241 with modeling data 211A. Method 400 includes an act of the submitting the code to the source code control system to facilitate updating the model data in production repository subsequent to synchronizing the code with the model data for the application in the local store (act 408). For example, computer system 201 can submit code 241 to source code control system 203 to facilitate updating model data 211A in production repository 202.

Source code control system 203 can use mechanisms to incorporate code 241 into other code, such as, for example, code 212, for an application. Source code control system 203 can also use version control and/or lifecycle management mechanisms to manage the lifecycle of the application so as to facilitate team development of the application.

Source code control system 203 can submit code 212 to build server 204. Builder server 204 can receive code 212 can build code 212 into repository package 213. Build server 204 can submit repository package 213 to production repository 202. Runtime 214 can then be used to run the application represented by repository package 213.

Accordingly, embodiments of the invention facilitate partitioning modeling platform data into nested horizontal slices. Using nested horizontal slices makes the modeling platform data more manageable and permits modeling platform data to align with existing tools and processes. Schemas and tables can be used to partition modeling platform data vertically and folders can be used to partition modeling platform data horizontally. Thus, a user-interface can preset the intersection of folders and schemas/tables as navigable chunks of data compatible with existing tools and processes, such as, for example, software development tools of an organization that is partitioning modeling data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a repository, the repository storing modeling data for a plurality of applications for an organization, the modeling data stored in accordance with a plurality of corresponding schemas, a method for partitioning the modeling data for more efficient use in modeling applications, the method comprising:

an act of partitioning the modeling data as an intersection of folders and schemas so as to represent the modeling data as portions of data having a specified granularity application modeling tools can efficiently process, partitioning including:
- an act of vertically partitioning the modeling data into a plurality of vertical partitions based on the plurality of corresponding schemas, vertical partitioning including for each schema in the plurality of corresponding schemas:
  - an act of creating one of the plurality of vertical partitions; and
  - an act of grouping modeling data corresponding to the schema with other modeling data corresponding to the schema in the vertical partition; and
- an act of horizontally partitioning the vertically partitioned modeling data into a folder hierarchy, the folder hierarchy including plurality of folders based on a user-defined folder structure, horizontally partitioning including for each folder in the folder hierarchy:
  - an act of grouping modeling data from any of the different vertical partitions that corresponds to the folder into the folder based on the user-defined folder structure such that the folder hierarchy groups relate modeling data together as portions of data having the specified granularity.

2. The method as recited in claim 1, wherein the act of partitioning the modeling data as an intersection of folders and schemas comprises an act of partitioning modeling data representing different types of programming elements into folders based on the applications that correspond to the programming elements.

3. The method as recited in claim 1, wherein the act of vertically partitioning the modeling data into a plurality of vertical partitions based on the plurality of corresponding schemas comprises an act of grouping together programming elements that are defined in accordance with the same schema in the same vertical partition.

4. The method as recited in claim 1, wherein the act of horizontally partitioning the vertically partitioned modeling data into a folder hierarchy comprises an act of horizontally partitioning vertically partitioned programming elements into a folder tree structure.

5. The method as recited in claim 1, wherein the act of horizontally partitioning the vertically partitioned modeling data into a folder hierarchy comprises an act of horizontally partitioning the vertically partitioned modeling data into a folder hierarchy that follows a classification taxonomy of the organization that is partitioning the modeling data.

6. The method as recited in claim 5, wherein the act of horizontally partitioning the vertically partitioned modeling data into a folder hierarchy comprises an act of horizontally partitioning the vertically partitioned modeling data into chunks of data compatible with other software development tools of the organization.

7. The method as recited in claim 1, wherein an act of grouping modeling data from any of the different vertical partitions that corresponds to the folder into the folder based on the user-defined folder structure comprises an act of grouping vertically partitioned modeling data together on a per application basis.

8. The method as recited in claim 1, further comprising:
- an act of presenting a user interface for interacting with the folder hierarchy, the user interface include controls that facilitate navigation between different portions of the folder hierarchy.

9. The method as recited in claim 1, further comprising a build server building the code into a repository package for storage at the production repository.

10. At a computer system including one or more processors and system memory, the computer communicatively coupled to a production repository and a source code control system and build server, the production repository storing modeling data for a plurality of applications, the source code control system and build server for building code into modeling data for applications, the computer system also including an integrated development environment, a repository folder manager, a local repository, and a synchronization tool, the integrated development environment for developing code for submission to the source code control system, the folder manager for organizing repository modeling data into folders and providing a user-interface for exploring the folders, the local repository for storing modeling data for applications under development at the computer system, the synchronization tool for synchronizing code developed at the integrated development environment with modeling data in the local repository, a method for managing the lifecycle of modeling data, the method comprising:
- an act of the folder manager accessing modeling data from the production repository;
- an act of presenting the modeling data for applications in hierarchically arranged folders in the user-interface, data included in leaf folders partitioned vertically based on a plurality of different schemas and partitioned horizontally based on application;
- an act of receiving an request to access modeling data for an application through the user-interface;
- an act of copying the modeling data from the production repository to the local repository;
- an act of receiving input for generating code for the application at the integrated development environment;
- an act of outputting the code from the integrated development environment;
- an act of synchronizing the code with the model data for the application in the local repository; and
- an act of the submitting the code to the source code control system to facilitate updating the model data in production repository subsequent to synchronizing the code with the model data for the application in the local repository.

11. The method as recited in claim 10, wherein an act of the folder manager accessing modeling data from the production repository comprises an act of accessing modeling data for developing software applications.

12. The method as recited in claim 10, wherein the act of presenting the modeling data for applications in hierarchically arranged folders in the user-interface comprises an act of presenting user-interface controls for navigating between different portions of the hierarchically arranged folders.

13. The method as recited in claim 10, wherein an act of presenting the modeling data for applications in hierarchically arranged folders comprises an act of presenting modeling data in a tree structure.

14. The method as recited in claim 10, wherein an act of presenting the modeling data for applications in hierarchically arranged folders in the user-interface comprises an act of presenting the hierarchically arranged folders in accordance with a classification taxonomy for the organization that is partitioning the modeling data.

15. The method as recited in claim 10, wherein the act of receiving a request to access modeling data for an application through the user-interface comprises an act of a user using user-interface controls to navigate to the folder representing the modeling data.

16. The method as recited in claim 10, further comprising prior to presenting the hierarchically arranged folders:
    an act of vertically partitioning the modeling data into a plurality of vertical partitions based on the plurality of corresponding schemas; and
    an act of horizontally partitioning the vertically partitioned modeling data into hierarchically arranged folders, hierarchically arranged folders including plurality of folders based on a user-defined folder structure.

17. The method as recited in claim 10, wherein the act of outputting the code from the integrated development environment comprises an act of outputting one of: Visual Basic source code and C# source code.

18. The method as recite in claim 10, further comprising an act of the source code control system managing the lifecycle of the application to facilitate team development of the application.

19. A system for managing the lifecycle of an application, the system comprising:
    one or more processors;
    system memory; and
    one or more computer storage media have stored thereon computer-executable instructions for managing the lifecycle of an application such that that when the computer-executable instructions are executed at a processor, the following occurs:
        a folder manager accesses modeling data from a production repository;
        partitioning the modeling data as an intersection of folders and schemas so as to represent the modeling data as portions of data having a specified granularity that application modeling tools can efficiently process, including:
            vertically partitioning the modeling data into a plurality of vertical partitions based on the plurality of corresponding schemas, vertical partitioning including for each schema in the plurality of corresponding schemas:
                creating one of the plurality of vertical partitions; and
                grouping modeling data corresponding to the schema with other modeling data corresponding to the schema in the vertical partition; and
            horizontally partitioning the vertically partitioned modeling data into a folder hierarchy, the folder hierarchy including plurality of folders based on a user-defined folder structure, horizontally partitioning including for each folder in the folder hierarchy:
                grouping modeling data from any of the different vertical partitions that corresponds to the folder into the folder based on the user-defined folder structure such that the folder hierarchy groups related modeling data together as portions of data having the specified granularity;
        presenting the modeling data in the folder hierarchy at a user-interface;
        receiving a request to access modeling data for an application through the user-interface;
        copying modeling data from the production repository to local repository;
        receiving input for generating code for the application at an integrated development environment;
        outputting the code from the integrated development environment;
        synchronizing the code with the model data for the application in the local repository;
        submitting the code to the source code control system to facilitate updating the model data in production repository subsequent to synchronizing the code with the model data for the application in the local repository; and
        the source code control system managing the lifecycle of the application to facilitate team development of the application.

20. The system for managing the lifecycle of an application as recited in claim 19, wherein the folder hierarchy is based on a classification taxonomy for the organization that developed the application.

* * * * *